United States Patent
Simon

(10) Patent No.: US 9,717,184 B1
(45) Date of Patent: Aug. 1, 2017

(54) MECHANICAL DRIVE ROLLER

(71) Applicant: AMERICAN-IOWA MANUFACTURING INC., Cascade, IA (US)

(72) Inventor: Shane D. Simon, Cascade, IA (US)

(73) Assignee: AMERICAN-IOWA MANUFACTURING INC., Cascade, IA (US)

( * ) Notice: Subject to any disclaimer, the term of this patent is extended or adjusted under 35 U.S.C. 154(b) by 0 days.

(21) Appl. No.: 15/206,743

(22) Filed: Jul. 11, 2016

(51) Int. Cl.
| | | |
|---|---|---|
| E01C 19/00 | (2006.01) | |
| A01G 1/12 | (2006.01) | |
| F16H 9/04 | (2006.01) | |
| F16H 9/24 | (2006.01) | |
| E01C 19/26 | (2006.01) | |
| F16D 48/00 | (2006.01) | |

(52) U.S. Cl.
CPC ............... *A01G 1/12* (2013.01); *E01C 19/26* (2013.01); *F16D 48/00* (2013.01); *F16H 9/04* (2013.01); *F16H 9/24* (2013.01)

(58) Field of Classification Search
CPC .... A01G 1/12; F16H 9/04; F16H 9/24; F16D 48/00; E01C 19/26
USPC .................................................. 404/83, 117
See application file for complete search history.

(56) References Cited

U.S. PATENT DOCUMENTS

| | | | |
|---|---|---|---|
| 4,319,655 A | 3/1982 | Hoppie | |
| 4,573,549 A | 3/1986 | Pankow | |
| 5,337,833 A * | 8/1994 | Rizzo | E01C 19/26 172/520 |
| 6,119,800 A * | 9/2000 | McComber | B60K 1/00 180/65.1 |
| 6,409,425 B1 * | 6/2002 | Okabe | E01C 19/283 404/117 |
| 6,837,648 B1 * | 1/2005 | Wadensten | E01C 19/283 404/117 |
| 2007/0173366 A1 * | 7/2007 | Goma Ayats | B60K 6/365 475/207 |
| 2008/0292401 A1 * | 11/2008 | Potts | E01C 19/238 404/95 |
| 2010/0192532 A1 | 8/2010 | Slater et al. | |
| 2012/0155961 A1 * | 6/2012 | Norton | E01C 19/26 404/75 |
| 2013/0302089 A1 * | 11/2013 | Sina | E02D 3/074 404/84.1 |
| 2016/0047445 A1 * | 2/2016 | Ellicott | F16H 7/06 474/69 |
| 2016/0332629 A1 * | 11/2016 | Dionne | F16D 48/06 |

OTHER PUBLICATIONS

Diversified Manufacturing, "Speed Roller—The Ultimate in Tournament Putting Greens and Turf Maintenance" http://www.speedroller.com/Manuals.htm, [retrieved from Internet on Apr. 11, 2016], 1 page.
Wikipedia, "Continuously Variable Transmission" Definition, https://en.wikipedia.org/wiki/Continuously_variable_transmission, [retrieved from the Internet on Mar. 8, 2016], 14 pages.

* cited by examiner

*Primary Examiner* — Raymond W Addie
(74) *Attorney, Agent, or Firm* — Zarley Law Firm, P.L.C.

(57) ABSTRACT

A roller driven by an engine through a reversible gearbox that is engaged via a belt or chain by a clutch that engages and disengages the belt base on changes in the engine RPM.

12 Claims, 6 Drawing Sheets

MECHANICAL DRIVE ROLLER

BACKGROUND OF THE INVENTION

This invention is directed to a roller made for smoothing and/or compacting a surface and more particularly, a roller having a mechanical drive.

Rollers are well-known in the art. In one example, rollers are used for putting greens and turf maintenance. Typically, these rollers have an engine connected to a hydrostatic transmission to propel the unit. The hydrostatic transmission is connected via a chain to a sprocket system that is connected to a rubber drive roller that propels the roller back and forth over a green.

Hydraulics are desirable because they allow for a quick change of direction. While use of hydraulics are beneficial, there exists a potential risk of hydraulic fluids leaking and damaging or killing the grass. Also, because a hydraulic drive unit does not have changing gear ratios, the unit is generally kept at wide open throttle during operation. This leads to an undesirable noise level. Thus, there is a need in the art for a device that addresses these deficiencies.

An objective of the present invention is to provide a roller having a mechanical drive.

Another objective is to provide a roller having a lower noise operating level.

These and other objectives will be apparent to those skilled in the art based upon the following written description, claims and drawings.

SUMMARY OF THE INVENTION

A mechanical drive roller having a drive assembly that includes an engine operatively connected to a gearbox or transaxle via a drive belt or chain. A primary drive clutch is mounted to the engine or to the transaxle and is positioned to selectively engage the drive belt based upon engine RPM. The transaxle is operatively connected to a drive roller.

DETAILED DESCRIPTION OF THE PREFERRED EMBODIMENT

Figure 1:
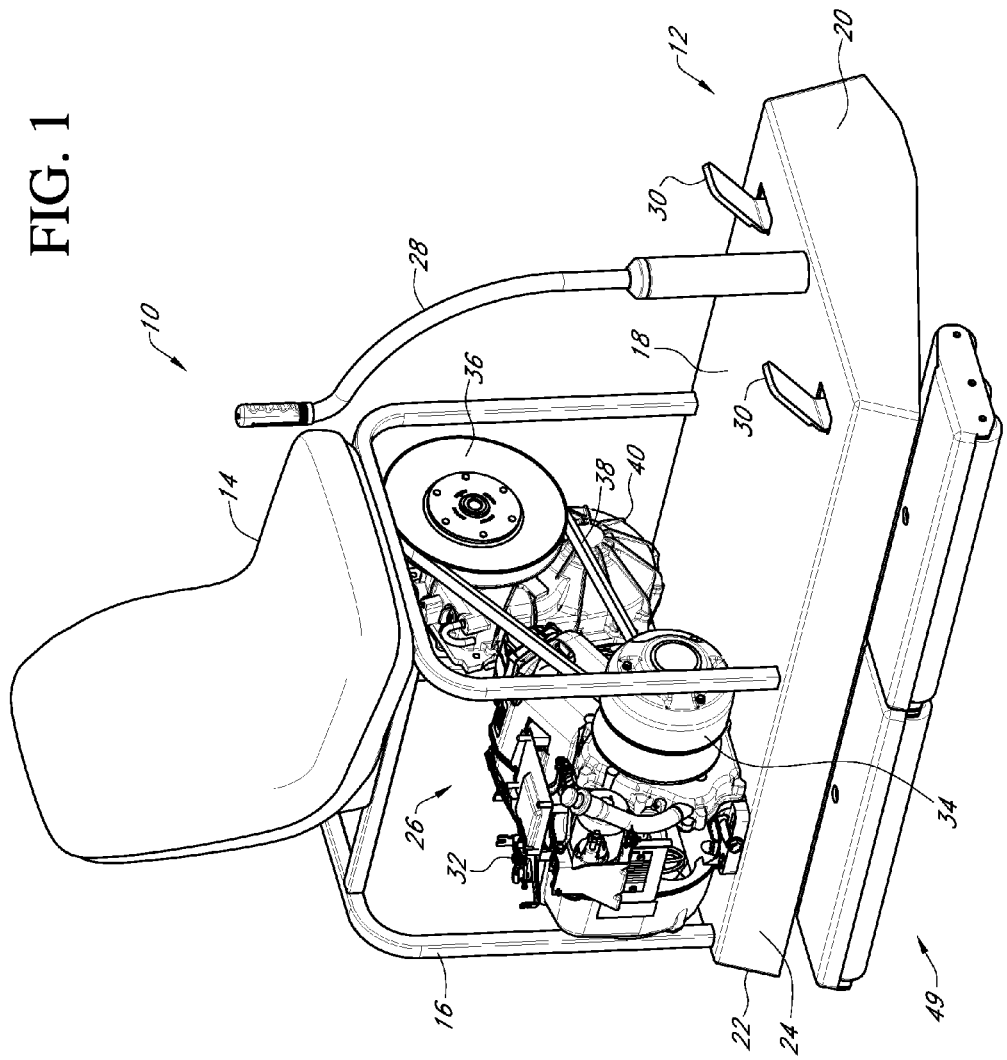
FIG. 1 is a perspective view of a mechanical drive roller.
Figure 2:
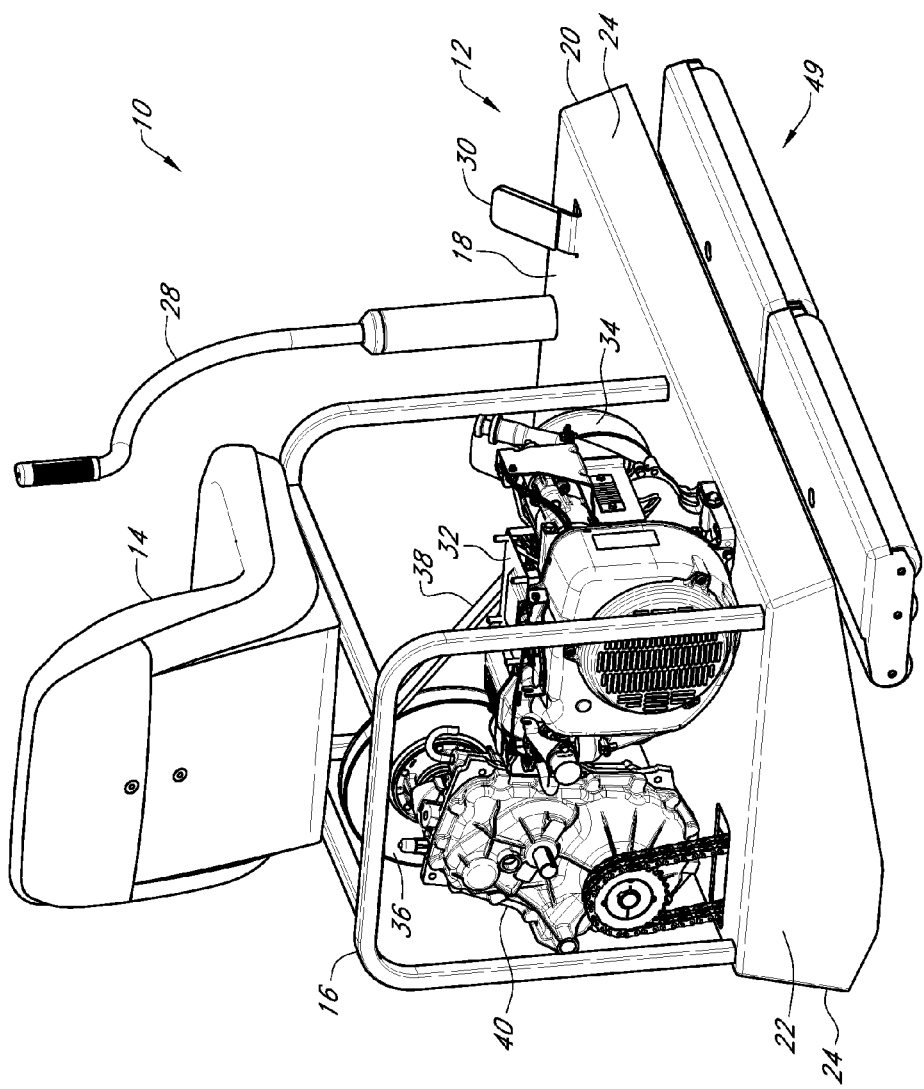
FIG. 2 is a perspective view of a mechanical drive roller.
Figure 3:
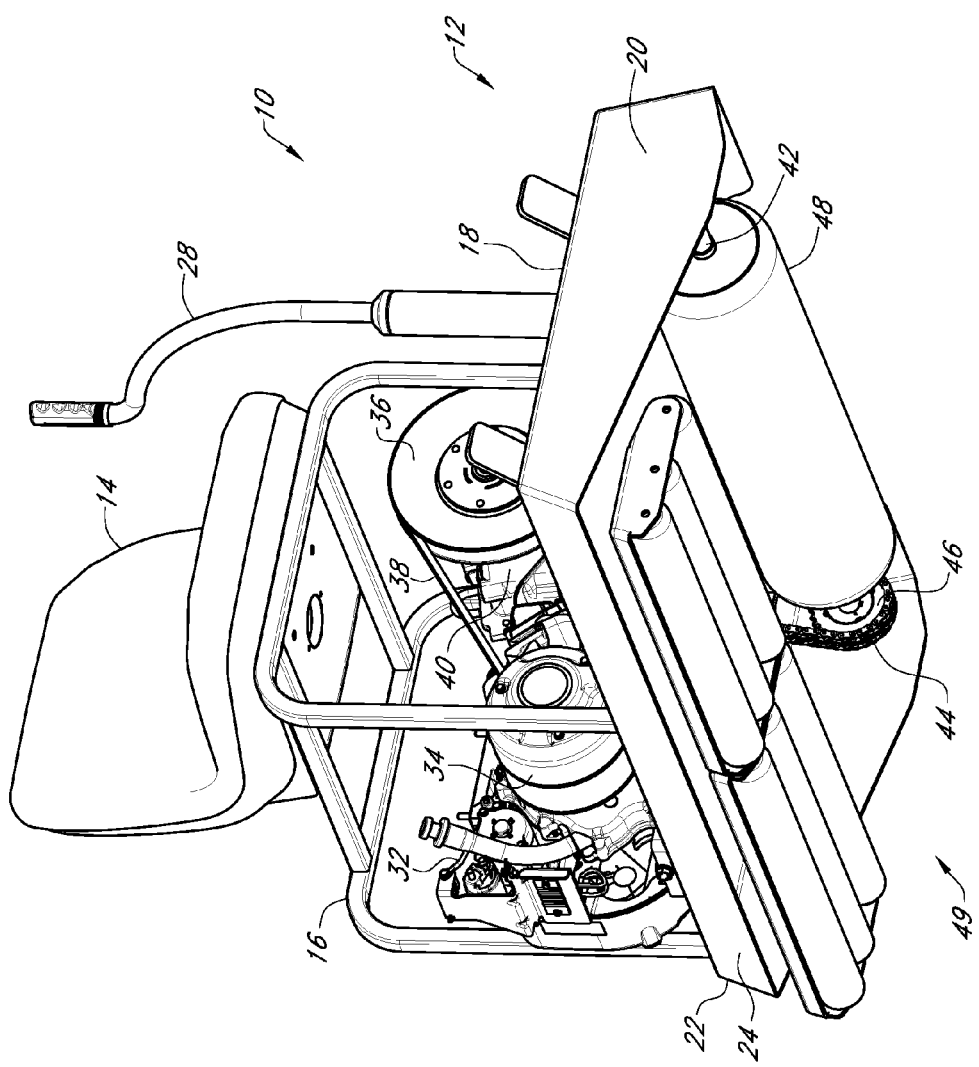
FIG. 3 is a perspective view of a mechanical drive roller.
Figure 4:
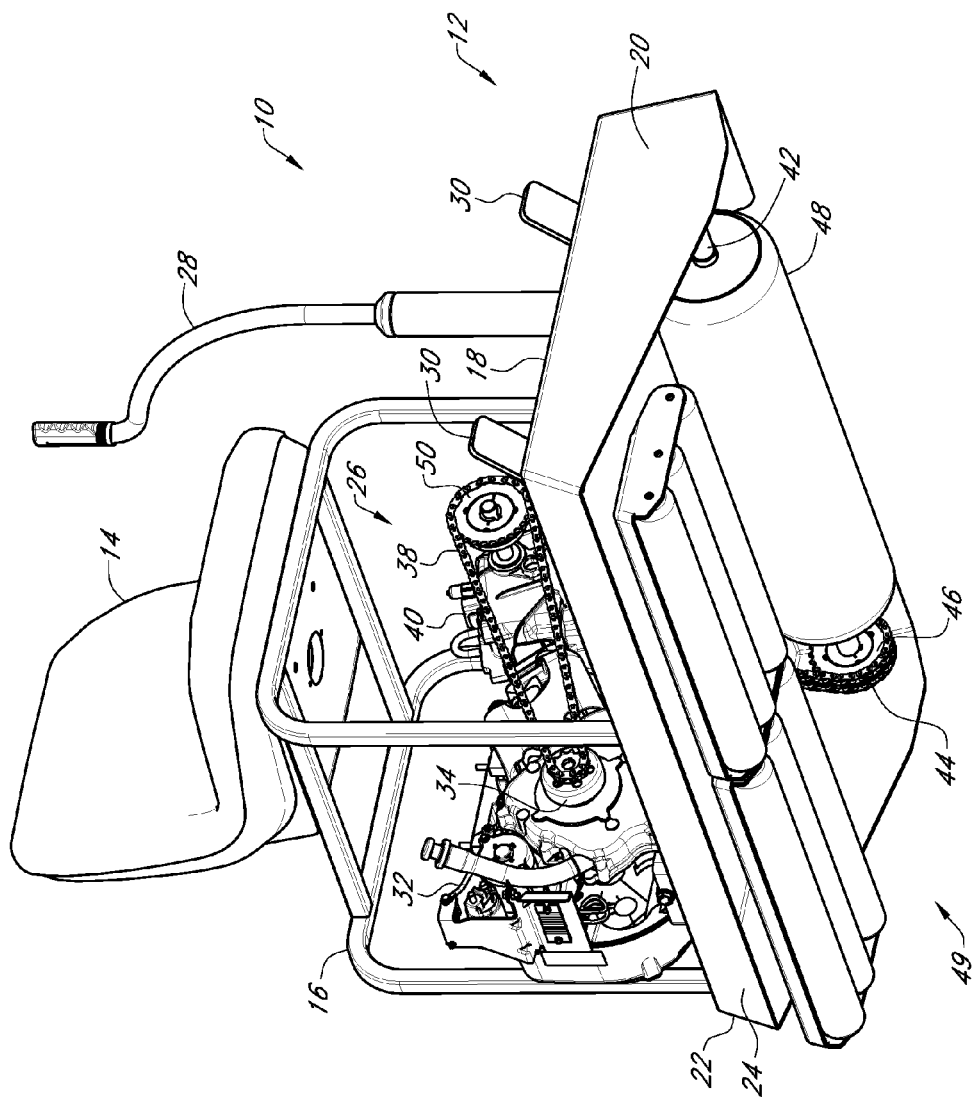
FIG. 4 is a perspective view of a mechanical drive roller.
Figure 5:
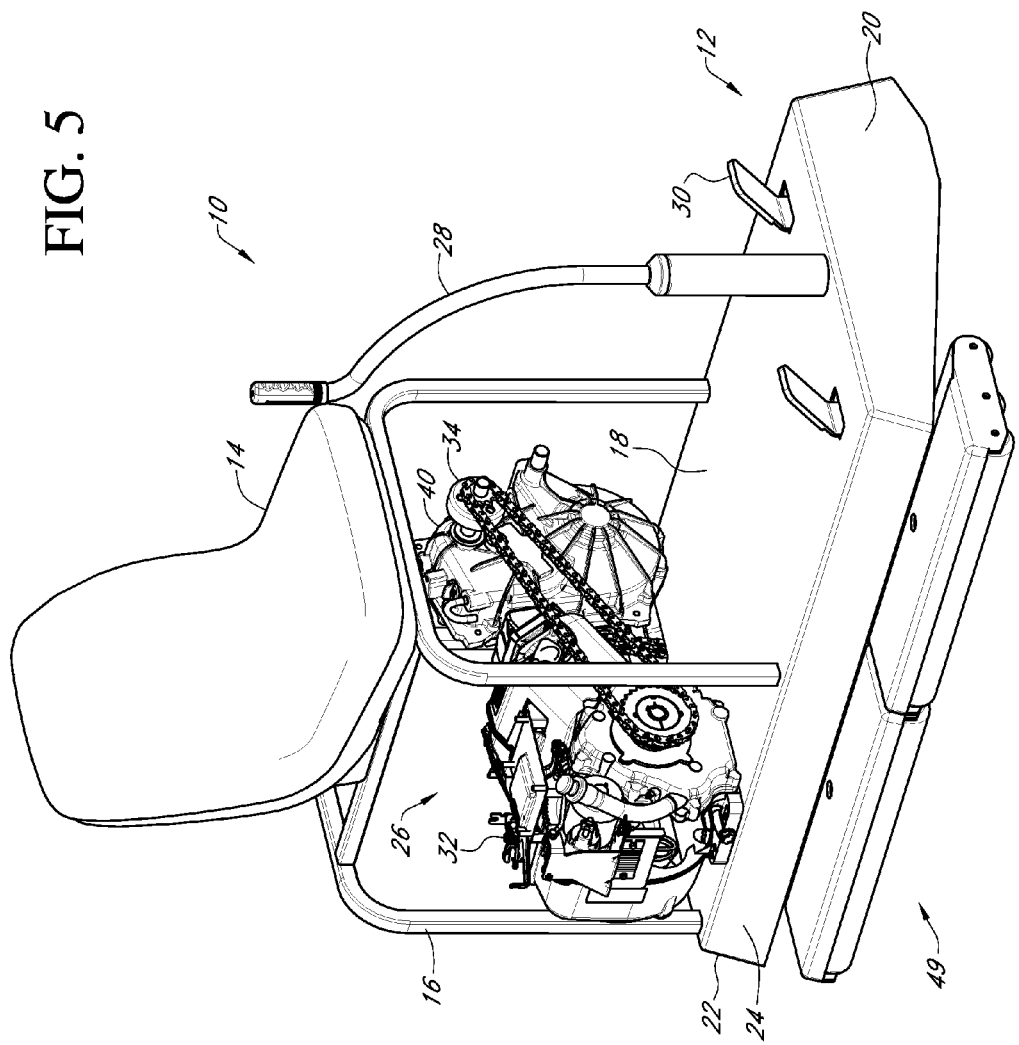
FIG. 5 is a perspective view of a mechanical drive roller.
Figure 6:
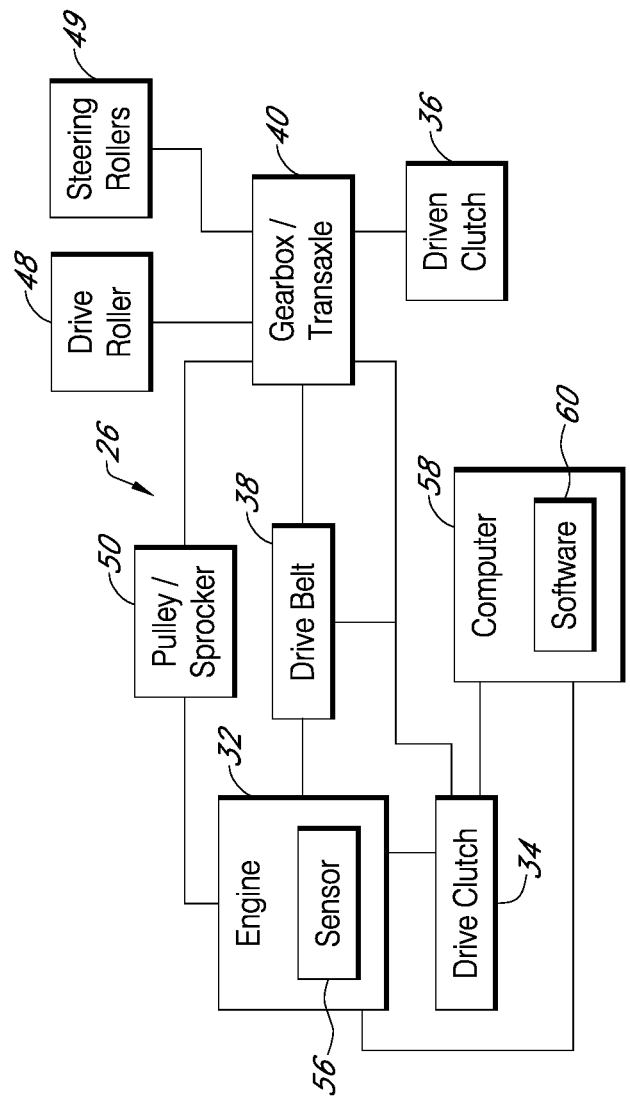
FIG. 6 is a block diagram of a drive assembly for a mechanical drive roller.

Referring to the figures, a roller 10 has a frame 12 with an operating seat 14 connected to the frame 12 by a plurality of leg supports 16. The frame 12 is of any size and shape and includes a top surface 18, a first or front end 20, a second or rear end 22 and a pair of opposing sides 24.

Extending through the top surface 18 of the frame 12 and connected to a drive assembly 26 is a steering arm or wheel 28. A pair of direction pedals 30 also extend through the top surface 18 of the frame 12 and are connected to the drive assembly 26.

The drive assembly 26 includes an engine 32 mounted to the top surface 18 of the frame 12. Connected to the engine 32 is a primary or drive clutch 34. The drive clutch 34 is connected to a secondary or driven clutch 36 by a drive belt or chain 38. The driven clutch 36 is mounted to a gearbox or transaxle 40. Preferably, the driven clutch 36 is torque sensing and shifts according to the torque taken to move the roller 10.

The gearbox 40 transfers power to an output shaft 42 through a final drive mechanism such as a chain or belt 44. Belt 44 is mounted to pulleys 46 and output shaft 42 is connected to a drive roller 48. The gearbox/transaxle 40 is also operatively connected to steering rollers 49.

In an alternative embodiment, the drive clutch 34 is connected to the engine 32 and to a pulley or sprocket 50 via a belt or chain 38. Pulley/sprocket 50 is mounted to an input shaft 54. The input shaft 54 is connected to the gearbox/transaxle 40. The gearbox/transaxle 40 is operatively connected to the drive roller 48 as previously described.

In yet another embodiment, pulley/sprocket 50 is connected to the engine 32 and to the drive clutch 34 via belt or chain 38. The drive clutch 34 is mounted to the gearbox/transaxle 40 which is operatively connected to the drive roller as previously described.

In operation for all embodiments, the primary drive clutch 34 is positioned to selectively engage drive belt 38 when the engine 32 reaches a predetermined revolution per minute (RPM). In one example, a sensor or encoder 56 is associated with the engine 32 and is connected to a computer 58 having software logic 60. When a directional pedal 30 is activated manually, the pedal 30 is connected to a throttle of the engine 32 causing rotation of the engine's drive shaft (not shown). The sensor 56 determines the RPM of the engine 32 and transmits the RPM information to the computer 58. The software logic 60 compares the transmitted RPM information with a predetermined RPM level. If the transmitted RPM information meets or exceeds the predetermined RPM level, the computer 58 sends a signal to the primary drive clutch 34 causing clutch 34 to engage belt 38.

Accordingly, a mechanical drive for a roller has been disclosed that, at the very least, meets all the stated objectives.

What is claimed:

1. A mechanical drive roller, comprising:
    a drive assembly having an engine operatively connected to a reversible gearbox via a drive mechanism;
    a primary drive clutch mounted to the engine and positioned to selectively engage the drive mechanism based upon the revolutions per minute of the engine; and
    a drive roller operatively connected to the gearbox.

2. The roller of claim 1 further comprising a sensor associated with the engine and connected to a computer having software logic.

3. The roller of claim 2 wherein the computer is connected to the primary drive clutch.

4. The roller of claim 1 wherein the drive mechanism is connected to a secondary drive clutch mounted to the gearbox.

5. The roller of claim 4 wherein the secondary drive clutch is torque sensing.

6. The roller of claim 1 wherein the drive mechanism is connected to a pulley mounted to an input shaft of the gearbox.

7. A mechanical drive roller, comprising:
    a drive assembly having an engine operatively connected to a transaxle via a drive mechanism;
    a primary drive clutch mounted to the transaxle and positioned to selectively engage the drive mechanism based upon the revolutions per minute of the engine; and
    a drive roller operatively connected to the transaxle.

8. A mechanical drive roller, comprising:
- an engine having a primary clutch connected to a secondary clutch by a drive belt, wherein the secondary clutch is mounted to a reversible gearbox;
- an output shaft connected to the reversible gearbox by a drive mechanism mounted on pulleys; and
- a drive roller connected to the output shaft, such that the drive roller is operatively connected to the reversible gearbox.

9. The roller of claim 8 wherein the secondary clutch is configured to be torque sensing, such that the secondary clutch shifts according to the torque necessary to move the roller.

10. The roller of claim 8 further comprising a plurality of steering rollers operatively connected to the reversible gearbox.

11. The roller of claim 8 wherein the primary drive clutch is positioned to selectively engage the drive belt based upon the revolutions per minute of the engine.

12. The roller of claim 8 further comprising a sensor and a computer having, a software logic associated with the engine, wherein the sensor is configured to sense an RPM of the engine and transmit the RPM to the software logic to compare the transmitted RPM to a predetermined RPM in order to determine whether to send a signal to the primary clutch to cause the primary clutch to engage the belt based on the comparison.

* * * * *